United States Patent
Chen et al.

(10) Patent No.: US 11,634,221 B2
(45) Date of Patent: Apr. 25, 2023

(54) UNMANNED AERIAL VEHICLE SYSTEM WITH TEMPERATURE CONTROL EQUIPMENT

(71) Applicant: Coretronic Intelligent Robotics Corporation, Hsinchu County (TW)

(72) Inventors: Ying-Chieh Chen, Hsinchu County (TW); I-Ta Yang, Hsinchu County (TW); Hsu-Chih Cheng, Hsinchu County (TW); Chi-Tong Hsieh, Hsinchu County (TW)

(73) Assignee: Coretronic Intelligent Robotics Corporation, Hsinchu County (TW)

( * ) Notice: Subject to any disclaimer, the term of this patent is extended or adjusted under 35 U.S.C. 154(b) by 1048 days.

(21) Appl. No.: 16/276,587

(22) Filed: Feb. 14, 2019

(65) Prior Publication Data
US 2019/0315463 A1    Oct. 17, 2019

(30) Foreign Application Priority Data
Apr. 16, 2018  (CN) .......................... 201810336251.5

(51) Int. Cl.
*B64F 1/22*     (2006.01)
*B64C 39/02*    (2023.01)
*F24H 9/20*     (2022.01)
*G05D 23/20*    (2006.01)

(52) U.S. Cl.
CPC ............ *B64C 39/024* (2013.01); *B64F 1/222* (2013.01); *F24H 9/2071* (2013.01); *G05D 23/20* (2013.01); *B64C 2201/201* (2013.01)

(58) Field of Classification Search
CPC ............ B64C 2201/20; B64C 2201/201; B64F 1/222; B64F 3/00
See application file for complete search history.

(56) References Cited

U.S. PATENT DOCUMENTS

| | | | |
|---|---|---|---|
| 9,718,564 B1 * | 8/2017 | Beckman | B61L 23/00 |
| 10,079,497 B2 * | 9/2018 | Cheng | H02J 7/00 |
| 10,239,638 B1 * | 3/2019 | Cohen | B64F 1/22 |
| 10,526,094 B2 * | 1/2020 | Cheng | B64F 1/22 |

(Continued)

FOREIGN PATENT DOCUMENTS

| | | |
|---|---|---|
| CN | 104102248 A | 10/2014 |
| CN | 104808710 A | 7/2015 |

(Continued)

*Primary Examiner* — Christopher D Hutchens
*Assistant Examiner* — Michael A. Fabula

(57) ABSTRACT

A temperature control equipment, adapted to control the temperature of a docking station for a UAV, wherein a cover of the docking station includes a first and a second vents. The temperature control equipment includes a first and a second temperature control devices. The first temperature control device includes a first and a second airflow openings, and the second temperature control device includes a third and a fourth airflow openings. The first, second, third, and fourth airflow openings, and the first and second vents form a first airflow path; or the first and second airflow openings, the first vent, and a third vent of the cover form a second airflow path; or the first, second, third, and fourth airflow openings, the first, second, and third vents, a fourth vent of the cover form a third airflow path. A heater is located on the first, second or third airflow path.

13 Claims, 7 Drawing Sheets

(56) References Cited

U.S. PATENT DOCUMENTS

| | | | |
|---|---|---|---|
| 11,111,033 B1* | 9/2021 | Burks | B64C 39/024 |
| 2017/0144776 A1* | 5/2017 | Fisher | B64F 1/24 |
| 2017/0175413 A1* | 6/2017 | Curlander | B64F 1/025 |
| 2017/0225801 A1* | 8/2017 | Bennett | B64F 1/222 |
| 2017/0225802 A1* | 8/2017 | Lussier | E04H 12/18 |
| 2018/0004231 A1 | 1/2018 | Michini et al. | |
| 2018/0141680 A1* | 5/2018 | Heinonen | B60L 53/12 |
| 2018/0148170 A1* | 5/2018 | Stamatovski | B64F 1/18 |
| 2018/0245365 A1* | 8/2018 | Wankewycz | B64C 39/024 |
| 2018/0327091 A1* | 11/2018 | Burks | B64C 39/024 |
| 2018/0354649 A1* | 12/2018 | Ortiz | E05B 65/06 |
| 2019/0002127 A1* | 1/2019 | Straus | B64F 1/12 |
| 2019/0100330 A1* | 4/2019 | Cheng | B64C 39/024 |
| 2019/0106224 A1* | 4/2019 | Nishikawa | B64C 39/024 |
| 2019/0177005 A1* | 6/2019 | Kim | B64C 39/024 |
| 2020/0301448 A1* | 9/2020 | Di Benedetto | G05D 1/0027 |
| 2020/0398999 A1* | 12/2020 | Ortiz | G07C 9/25 |
| 2021/0031947 A1* | 2/2021 | Wankewycz | B64F 1/222 |

FOREIGN PATENT DOCUMENTS

| | | |
|---|---|---|
| CN | 106542109 A | 3/2017 |
| CN | 206031812 U | 3/2017 |
| CN | 206402613 U | 8/2017 |
| CN | 107355983 A | 11/2017 |
| CN | 107529042 A | 12/2017 |
| CN | 206713239 U | 12/2017 |
| WO | 2012095646 A1 | 7/2012 |
| WO | 2017109780 A1 | 6/2017 |

* cited by examiner

UNMANNED AERIAL VEHICLE SYSTEM WITH TEMPERATURE CONTROL EQUIPMENT

FIELD OF THE INVENTION

The invention relates to a temperature control equipment, and more particularly to a temperature control equipment adapted to control the temperature of a docking station for a UAV (Unmanned Aerial Vehicle).

BACKGROUND OF THE INVENTION

The UAV may be used to perform a variety of aerial functions in outdoor or indoor environments, such as surveillance and observation. The UAV can be remotely piloted by a user or can be autonomous or semi-autonomous vehicles that fly missions using preprogrammed coordinates, GPS navigation, etc. The UAV may be equipped with cameras to provide imagery during flight, which may be used for navigation or other purposes. The UAV can also be equipped with sensors to provide local weather and atmospheric conditions, radiation levels, and other conditions, and the UAV may also include cargo bays, hooks, or other means for carrying payloads. Therefore, the diversified application potential makes the UAV constantly grow.

The UAV may be electrically powered and may require a charging mechanism to charge the batteries and power systems of the UAV. When the UAV is used in automatic flight inspection, a docking station may be used to let the UAV park or charge. However, in a low temperature environment, the UAV system may be damaged due to low temperature. For example, the structure of the docking station may not be able to open due to low temperature, making the UAV inaccessible; when the temperature inside the docking station is too low, the battery of the UAV will not be charged or not be filled because of the low temperature; and the UAV system may also be damaged due to low temperature. Therefore, how to solve the problems that the UAV system operating in the low temperature environment is the focus of attention of the relevant personnel in the field.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

An objective of the invention is to provide a temperature control equipment to control the temperature of a docking station for a UAV.

Other objectives and advantages of the invention may be further illustrated by the technical features disclosed in the invention.

In order to achieve one or a portion of or all of the objectives or other objectives, an embodiment of the invention provides a temperature control equipment, adapted to control the temperature of a docking station for a UAV, wherein the docking station includes a base and a cover, the cover includes a first vent and a second vent. The cover is connected to the base and moves relative to the base between an open position and a closed position. When the cover is at the closed position, the cover covers the base. When the cover is at the open position, the docking station is for the UAV to enter and land on the base. The temperature control equipment includes a first temperature control device, a second temperature control device and a heater. The first temperature control device and the second temperature control device are disposed outside the cover, the first temperature control device moves with the cover between the open position and the closed position. The first temperature control device includes a first airflow opening and a second airflow opening, and the first airflow opening is connected to the first vent. The second temperature control device moves with the cover between the open position and the closed position, the second temperature control device includes a third airflow opening and a fourth airflow opening. The third airflow opening is connected to the second vent. The heater is disposed inside the first temperature control device. When the cover is at the closed position, the first airflow opening, the first vent, the second vent, the third airflow opening, the fourth airflow opening, and the second airflow opening sequentially form a first airflow path; or the first airflow opening, the first vent, a third vent of the cover, and the second airflow opening sequentially form a second airflow path; or the first airflow opening, the first vent, the second vent, the third airflow opening, the fourth airflow opening, a fourth vent of the cover, the third vent and the second airflow opening sequentially form a third airflow path. The heater is located on the first airflow path, the second airflow path, or the third airflow path.

The temperature control equipment of the invention is provided with a first temperature control device, a second temperature control device, and a heater. When the cover is at the closed position, the heater can heat the air inside the docking station, which can prevent, for example, the cover of the docking station cannot be opened, the battery of the UAV is abnormally charged, or the equipment of UAV and/or docking station is damaged due to low temperature.

Other objectives, features and advantages of The invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
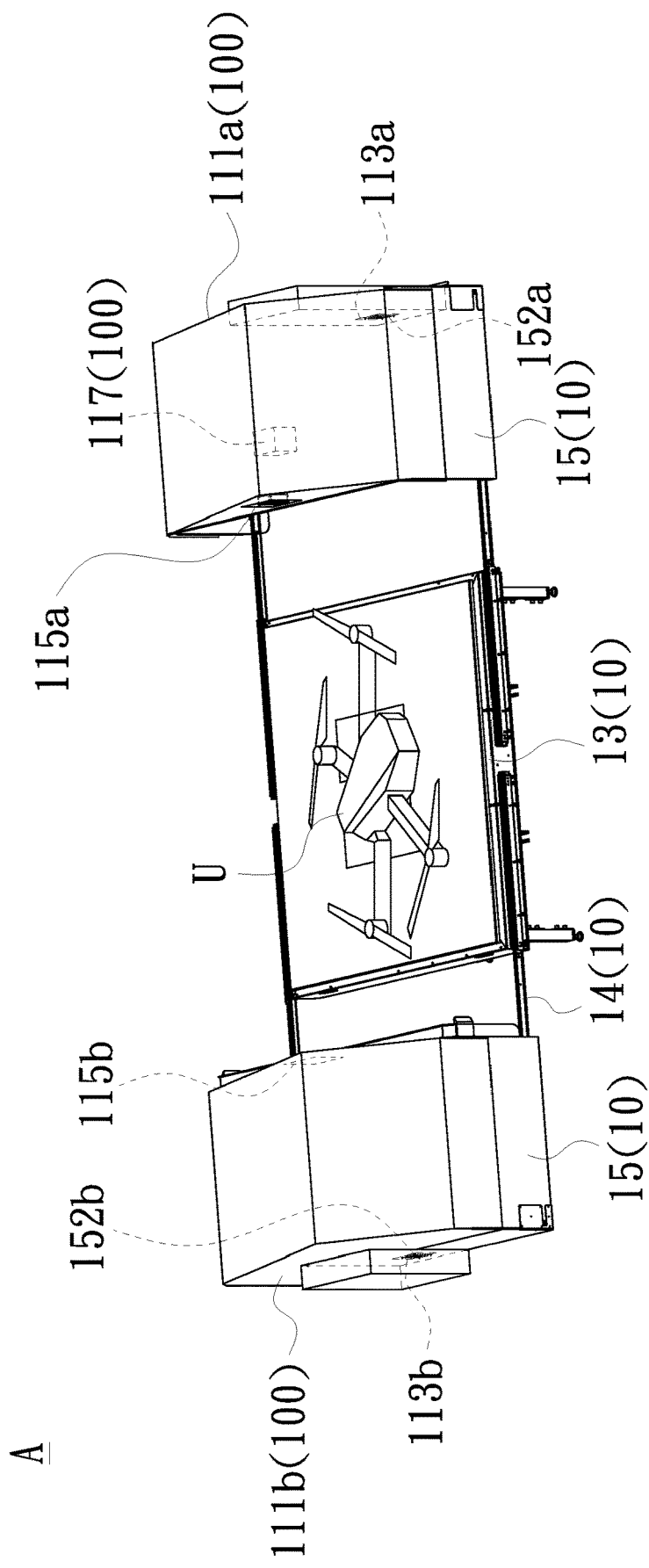
FIG. 1A and FIG. 1B show the schematic diagrams of a temperature control equipment according to an embodiment of the invention applied to a docking station.
Figure 1B:
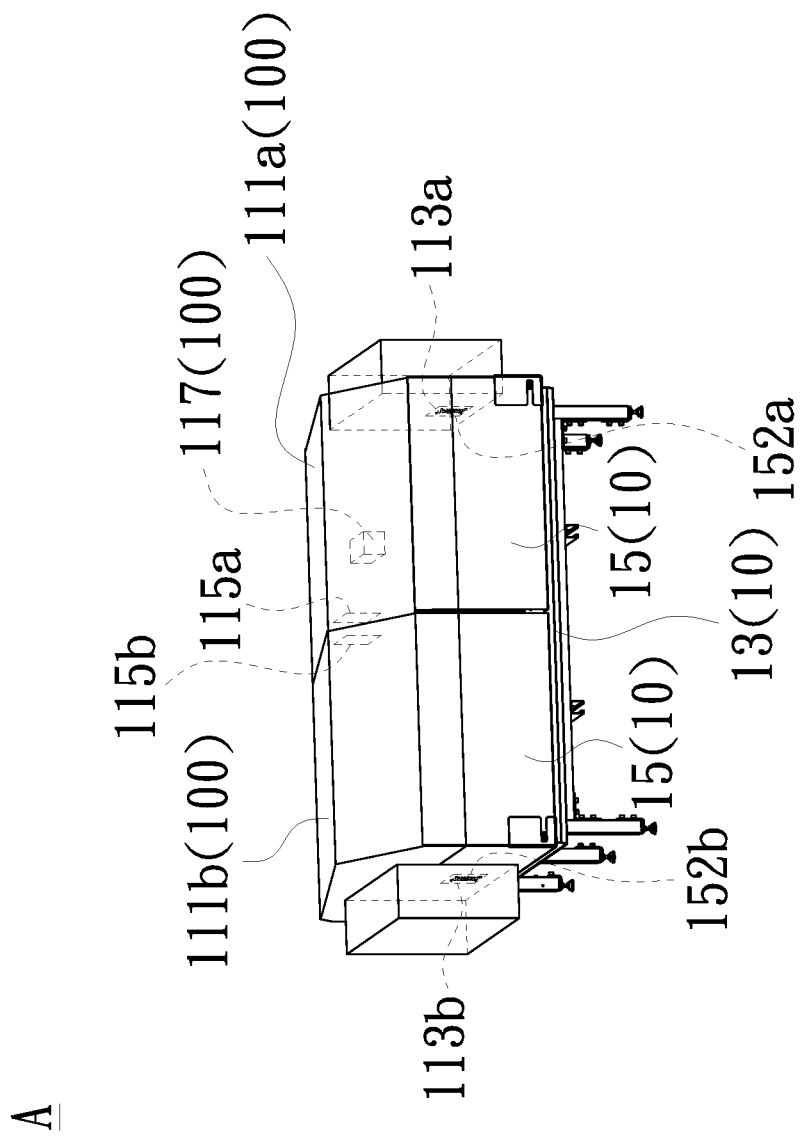

Referring to FIG. 1A and FIG. 1B, which are the schematic diagrams of a temperature control equipment according to an embodiment of the invention applied to a docking station, wherein FIG. 1A shows the schematic diagram of the cover 15 at the open position, and FIG. 1B shows the schematic diagram of the cover 15 at the closed position. The UAV system A includes a docking station 10 and a temperature control equipment 100. The docking station 10 includes a base 13 and a cover 15, and UAV U is able to be parked at the docking station 10. The temperature control equipment 100 includes a first temperature control device 111a, a second temperature control device 111b and a heater 117. The first temperature control device 111a and the second temperature control device 111b are disposed outside the cover 15, and moving with the cover 15 between the open position (as shown in FIG. 1A) and the closed position (as shown in FIG. 1B). When the cover 15 is at the closed position, the heater 117 of the temperature control equipment 100 could heat the air inside the docking station 10, which can avoid that, for example, the cover 15 of the docking station 10 cannot be opened due to low temperature, the battery (not shown) of the UAV U is abnormally charged due to the low temperature, or the equipment of the UAV U and/or the docking station 10 is damaged due to low temperature. The detailed description will be presented later in the specification.

Figure 2:
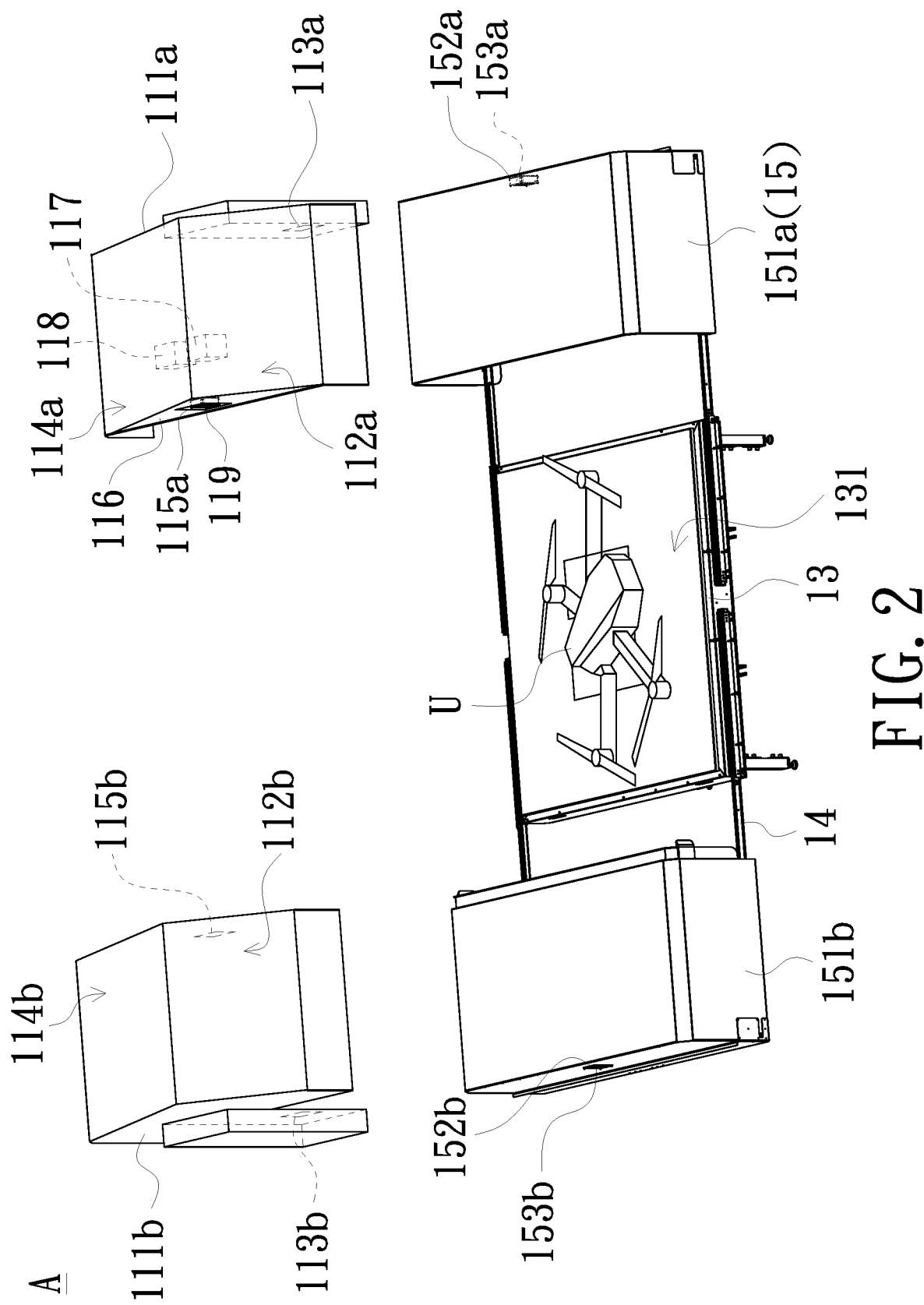
FIG. 2 shows an exploded schematic diagram of a temperature control equipment according to an embodiment of the invention applied to a docking station.

Referring to FIG. 2, which is an exploded schematic diagram of the temperature control equipment 100 of the embodiment shown in FIG. 1A and FIG. 1B. The cover 15 of the docking station 10 includes a first vent 152a and a second vent 152b, wherein the first vent 152a and the second vent 152b are opposite each other. The cover 15 is connected to the base 13 and moves relative to the base 13 between the open position and the closed position, wherein FIG. 2 shows the schematic diagram that the cover 15 is at the open position. There is a space between the base 13 and the cover 15 of the docking station 10. When the cover 15 is at the open position, the docking station 10 allows the UAV U to enter and land on the base 13. When the cover 15 is at the closed position, the cover 15 covers the base 13, and the space between the base 13 and the cover 15 provides a suitable environment for the UAV U to park or charge.

The temperature control equipment 100 includes a first temperature control device 111a, a second temperature control device 111b and a heater 117. In the embodiment, the first temperature control device 111a and the second temperature control device 111b are disposed outside the cover 15. The first temperature control device 111a moves with the cover 15 between the open position and the closed position. The first temperature control device 111a includes a first airflow opening 113a and a second airflow opening 115a. The second temperature control device 115b moves with the cover 15 between the open position and the closed position. The second temperature control device 111b includes a third airflow opening 113b and a fourth airflow opening 115b. As shown in FIG. 1A and FIG. 1B, when the first temperature control device 111a and the second temperature control device 111b are disposed outside the cover 15, the first airflow opening 113a of the first temperature control device 111a is connected to the first vent 152a of the cover 15, and the third airflow opening 113b of the second temperature control device 111b is connected to the second vent 152b of the cover 15.

In the embodiment, the first airflow opening 113a of the first temperature control device 111a and the third airflow opening 113b of the second temperature control device 111b is closer to the base 13 of the docking station 10 than the second airflow opening 115a of the first temperature control device 111a and the fourth airflow opening 115b of the second temperature control device 111b.

Figure 3:
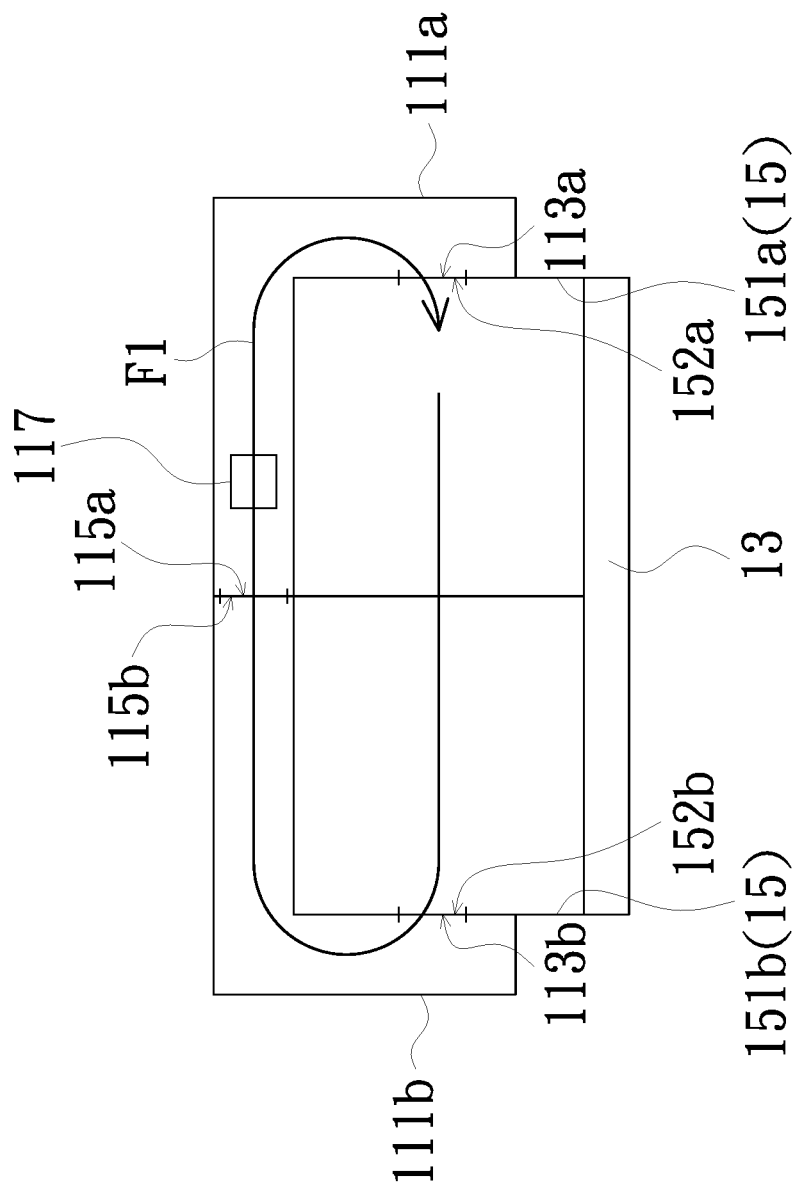
FIG. 3 shows a schematic diagram of an airflow path of a temperature control equipment according to an embodiment of the invention applied to a docking station.

Referring to FIG. 3, which is a schematic diagram of the airflow path of the embodiment shown in FIG. 1A and FIG. 2. The heater 117 is disposed inside the first temperature control device 111a. When the cover 15 is at the closed position, the first airflow opening 113a of the first temperature control device 111a, the first vent 152a of the cover 15, the second vent 152b of the cover 15, the third airflow opening 113b of the second temperature control device 111b, the fourth airflow opening 115b of the second temperature control device 111b, and the second airflow opening 115a of the first temperature control device 111a sequentially form a first airflow path F1. The heater 117 is located on the first airflow path F1 so that the air heated by the heater 117 can flow into the interior of the docking station 10, that is, the air heated by the heater 117 can flow into the space between the base 13 and the cover 15 to avoid the damage due to low temperature. In the embodiment, the air heated by the heater 117 in the first temperature control device 111a passes from the first airflow opening 113a of the first temperature control device 111a through the first vent 152a of the cover 15 and flows into cover 15 of the docking station 10. Thereby, the temperature of the internal space of the docking station 10 can be raised. Then, the air passes through the second vent 152b of the cover 15 and flows into the second temperature control device 111b from the third airflow opening 113b, and then passes through the fourth airflow opening 115b and the second airflow opening 115a in sequence, and is heated by the heater 117 of the first temperature control device 111a. The air in the first airflow path F1 is convected, for example, in a manner of natural heat convection, so that the air inside the docking station 10 is heated by the heater 117, to which the invention is not limited.

It is worth to notice that the first airflow opening 113a, the second airflow opening 115a, the third airflow opening 113b, and the fourth airflow opening 115b could be virtual holes to facilitate the representation of the flowing direction and path of the first airflow path F1. The first airflow opening 113a, the second airflow opening 115a, the third airflow opening 113b, and the fourth airflow opening 115b could also be physical holes. For example, the first airflow opening 113a, the second airflow opening 115a, the third airflow opening 113b, and/or the fourth airflow opening 115b could be physical holes formed in the structure of the first temperature control device 111a and/or the second temperature control device 111b, to which the invention is not limited. The positions of the second airflow opening 115a and the fourth air flow opening 115b shown in FIG. 1A to FIG. 3 are only an example, to which the invention is not limited. When the cover 15 is at the closed position, the first airflow opening 113a, the first vent 152a, the second vent 152b, the third airflow opening 113b, the fourth airflow opening 115b, and the second airflow opening 115a could sequentially form the first airflow path F1 is sufficient.

Referring to FIG. 2. Specifically, the cover 15 of the docking station 10 includes a first sub-cover 151a and a second sub-cover 151b. The first vent 152a is disposed on the first sub-cover 151a, and the second vent 152b is disposed on the second sub-cover 151b. The first sub-cover 151a and the second sub-cover 151b are moving in opposite directions when the cover 15 is moving relative to the base 13 between the open position and the closed position, that is, the first sub-cover 151a and the second sub-cover 151b are at the closed position when the base 13 is completely covered, and are moved away from each other to the open position. The first temperature control device 111a is disposed outside the first sub-cover 151a, and the second temperature control device 111b is disposed outside the second sub-cover 151b.

Incidentally, the first temperature control device 111a and the second temperature control device 111b, for example, are detachable cover bodies disposed outside the cover 15. The cover body could be designed, for example, to flow air between the first airflow opening 113a and the second airflow opening 115a of the first temperature control device 111a, and to flow air between the third airflow opening 113b and the fourth airflow opening 115b of the second temperature control device 111b. The first temperature control device 111a and the second temperature control device 111b can be disposed outside the cover 15 by, for example, snapping, screwing or placing, to which the invention is not limited.

In addition, the docking station 10 could also include a driving mechanism 14. The driving mechanism 14 is configured to drive the first sub-cover 151a and the second sub-cover 151b (as shown in FIG. 1A and FIG. 2) to move relative to the base 13 between the open position and the closed position. The driving mechanism 14 can be composed, for example, of the motor, the gear, and/or the slide rail, to which the invention is not limited. As long as the driving mechanism 14 could drive the first sub-cover 151a and the second sub-cover 151b to move relative to the base 13 between the open position and the closed position is sufficient.

Moreover, as shown in FIG. 2, the temperature control equipment 100 may further include a partition 116. The partition 116 is located between the first temperature control device 111a and the second temperature control device 111b. In the embodiment, the partition 116 is disposed on the first temperature control device 111a, and the second airflow opening 115a is a hole disposed on the partition 116 as an example.

Furthermore, the temperature control equipment 100 could further include a fan (not shown in the figures). The fan is disposed inside the first temperature control device 111a or the second temperature control device 111b, and the fan is located on the first airflow path F1. When the cover 15 is at the closed position, the operation of the fan can cause convection of the air in the first airflow path F1, so that the air heated by the heater 117 can flow into the interior of the docking station 10. Specifically, the temperature control equipment 100 could include, for example, a fan 119. The fan 119 is disposed on the second airflow opening 115a of the first temperature control device 111a to cause convection of the air in the first airflow path F1. In the embodiment, the fan 119 is disposed on the second airflow opening 115a of the partition 116 as an example. By the arrangement of the partition 116, it can prevent the air from flowing back to the second temperature control device 111b when the air passing through the second airflow opening 115a is convected on the first airflow path F1. The setting of the fan 119 is merely an example, to which the invention is not limited. As long as the fan is disposed on the first airflow path F1, and the air in the first airflow path F1 can be convected is sufficient.

In addition, the first vent 152a of the first sub-cover 151a could be provided with a fan 153a, and the second vent 152b of the second sub-cover 151b could also be provided with a fan 153b, that is, the airflow through the fans 153a/153b also passes through the vents 152a/152b at the same time, to which the invention is not limited. When the cover 15 is at the closed position, the operation of the fans 153a/153b can cause convection of the air in the first airflow path F1, so that the air in the docking station 10 can be heated by the heater 117.

It is worth to notice that the invention does not limit the direction of air convection on the first airflow path F1. The direction of air convection on the first airflow path F1 may be a clockwise direction indicated by the arrow of the first airflow path F1 shown in FIG. 3, or may be an opposite counterclockwise direction to the arrow indicated of the first air flow path F1.

Incidentally, the base 13 of the docking station 10 includes an upper surface 131. The top of the first temperature control device 111a includes surfaces 112a and 114a, which are not parallel to the upper surface 131, that is, the surfaces 112a and 114a are arranged adjacent to each other in V-shaped. The top of the second temperature control device 111b includes surfaces 112b and 114b, which are not parallel to the upper surface 131, that is, the surfaces 112b and 114b are arranged adjacent to each other in V-shaped. Surfaces 112a, 114a, 112b, and 114b that are not parallel to the upper surface 131 could cause objects such as rain, snow, and/or dust to slip off to prevent them from accumulating on top of the temperature control equipment 100 to cause possible damage.

Figure 4:
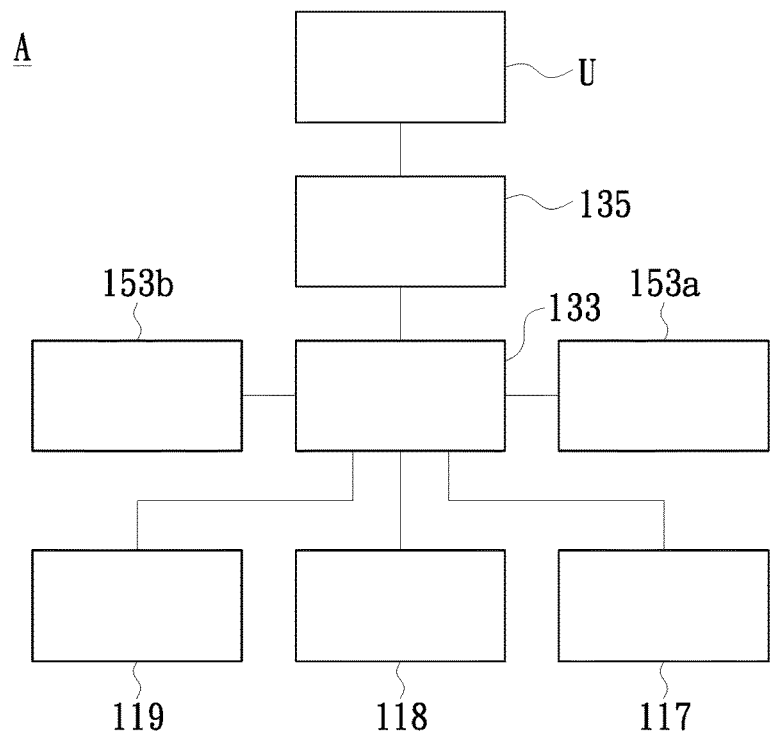
FIG. 4 is a block diagram of a temperature control equipment according to an embodiment of the invention applied to a docking station.

Referring to FIG. 4, FIG. 4 is a block diagram of the temperature control equipment 100 shown in FIG. 1A to FIG. 3 applied to the docking station 10. In the embodiment, the docking station 10 includes a controller 133 and/or a power supply 135. When the cover 15 is at the closed position, the controller 133 could be coupled to the fan 153a, the fan 153b, and the power supply 135 by wire or wirelessly, and the power supply 135 could be coupled to the UAV U. The controller 133 could control the operation of the fan 153a and/or 153b, and could control the charging operation of the UAV U. The power supply 135 could provide the power required to charge the UAV U and/or operate the fan 153a and/or 153b.

In addition, the temperature control equipment 100 could further include a temperature sensor 118 disposed inside the first temperature control device 111a or the second temperature control device 111b for sensing the temperature inside the first temperature control device 111a or the second temperature control device 111b. When the first temperature control device 111a and the second temperature control device 111b are assembled outside the cover 15, the controller 133 can be coupled to the heater 117 and the temperature sensor 118 by wire or wirelessly. When the cover 15 is at the closed position and the temperature sensor 118 detects that the temperature is lower than a first preset value (not shown in the figures), the controller 133 activates the heater 117 to heat the air. When the temperature sensor 118 detects that the temperature is above a second preset value (not shown in the figures), the controller 133 turns off the heater 117. Thereby, the temperature inside the first temperature control device 111a or the second temperature control device 111b can be controlled by the setting of the temperature sensor 118. Specifically, the temperature sensor 118 may also be disposed on the first airflow path F1 inside the first temperature control device 111a or the second temperature control device 111b, and sense the temperature of the airflow in the first airflow path F1.

In another way, the temperature sensor 118 could also be disposed adjacent to the heater 117 (as shown in FIG. 2), to which the invention is not limited. The temperature sensor 118 is for sensing the temperature of the heater 117. When the cover 15 is at the closed position and the temperature sensor 118 detects that the temperature is lower than a first preset value (not shown in the figures), the controller 133 activates the heater 117 to heat the air. When the temperature sensor 118 detects that the temperature is above a second preset value (not shown in the figures), the controller 133 turns off the heater 117. Thereby, the heater 117 can be prevented from being overheated and damaged by the arrangement of the temperature sensor 118 adjacent to the heater 117.

Moreover, in other embodiments of the invention, the fan 119 may also be disposed adjacent to the heater 117. When the first temperature control device 111a and the second temperature control device 111b are assembled outside the cover 15 (as shown in FIG. 2), the controller 133 can be coupled to the fan 119 by wire or wirelessly. The controller 133 can control the operation of the fan 119 to convect the air around the heater 117. The fan 119 disposed adjacent to the heater 117 could also, for example, dissipate heat from the heater 117 to prevent the heater 117 from overheating. In detail, the operation of the fan 119 could also cooperate with the detection result of the temperature sensor 118. For example, when the temperature sensor 118 detects that the temperature is above a preset value, the controller 133 could control the operation of the fan 119 (such as starting the fan 119 or increasing the speed of the fan 119) to convect the air around the heater 117 to prevent the heater 117 from overheating and damage.

Figure 5:
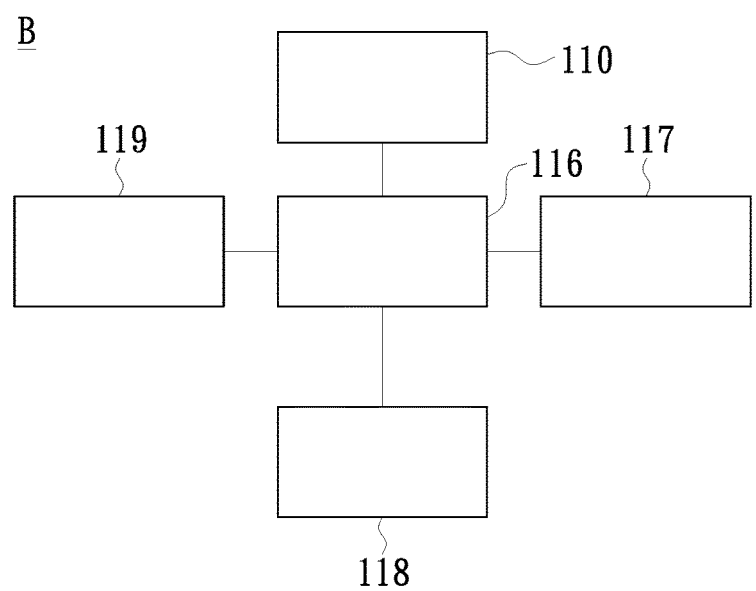
FIG. 5 is a block diagram of a temperature control equipment according to another embodiment of the invention applied to a docking station.

Referring to FIG. 5, FIG. 5 is a block diagram of a temperature control equipment according to another embodiment of the invention applied to a docking station. The UAV system B of the embodiment has a similar structure and function as the UAV system A shown in FIG. 1A to FIG. 4. The embodiment shown in FIG. 5 is different from the embodiment shown in FIG. 1A to FIG. 4 in that the temperature control equipment 100 further includes a controller 116 and/or a power supply 110. The heater 117, fan 119 and/or the temperature sensor 118 are coupled to the controller 116 and/or the power supply 110 by wire or wirelessly. When the cover 15 is at the closed position (as shown in FIG. 2), the temperature control equipment 100 could directly control the operation of the heater 117, the fan 119, and/or the temperature sensor 118 by setting the controller 116 on the temperature control equipment 100. The power supply 110 could provide the power required to operate the heater 117, the fan 119, and/or the temperature sensor 118. The connection of the power supply 110 shown in FIG. 5 is merely an example, to which the invention is not limited. As long as the power supply 110 could provide power to heater 117, fan 119, and/or temperature sensor 118 is sufficient.

Figure 6:
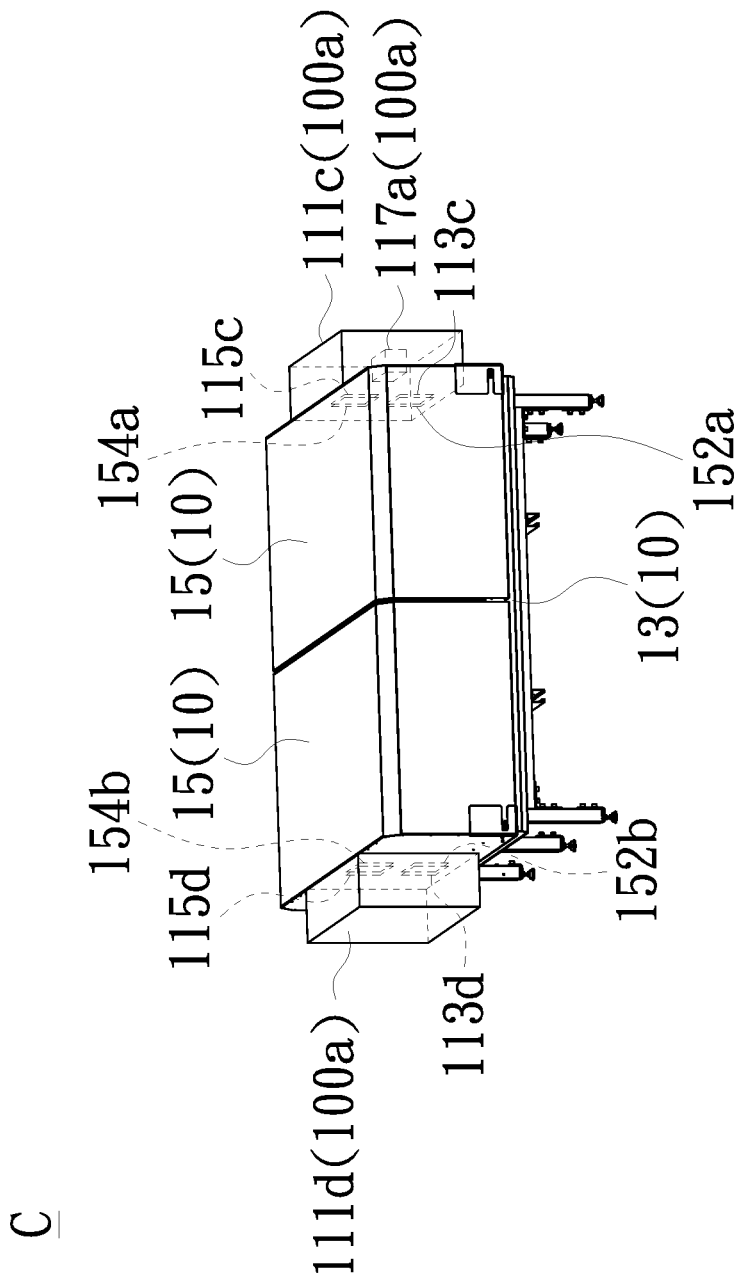
FIG. 6 shows a schematic diagram of a temperature control equipment according to still another embodiment of the invention applied to a docking station.

Referring to FIG. 6, FIG. 6 is a schematic diagram of a temperature control equipment according to still another embodiment of the invention applied to a docking station. The UAV system C includes a docking station 10 and temperature control equipment 100a, wherein FIG. 6 shows the schematic view of the cover 15 at the closed position. The UAV system C of the embodiment has a similar structure and function as the UAV system A shown in FIG. 1A to FIG. 4. The embodiment shown in FIG. 6 is different from the embodiment shown in FIG. 1A to FIG. 4 in that the cover 15 of the docking station 10 further includes a third vent 154a and a fourth vent 154b. The temperature control equipment 100a includes a first temperature control device 111c, a second temperature control device 111d, and a heater 117a. When the first temperature control device 111c is disposed outside the cover 15, the second airflow opening 115c of the first temperature control device 111c is connected to the third vent 154a of the cover 15. When the second temperature control device 111d is disposed outside the cover 15, the fourth airflow opening 115d of the second temperature control device 111d is connected to the fourth vent 154d of the cover 15. The heater 117a is disposed inside the first temperature control device 111c.

Figure 7:
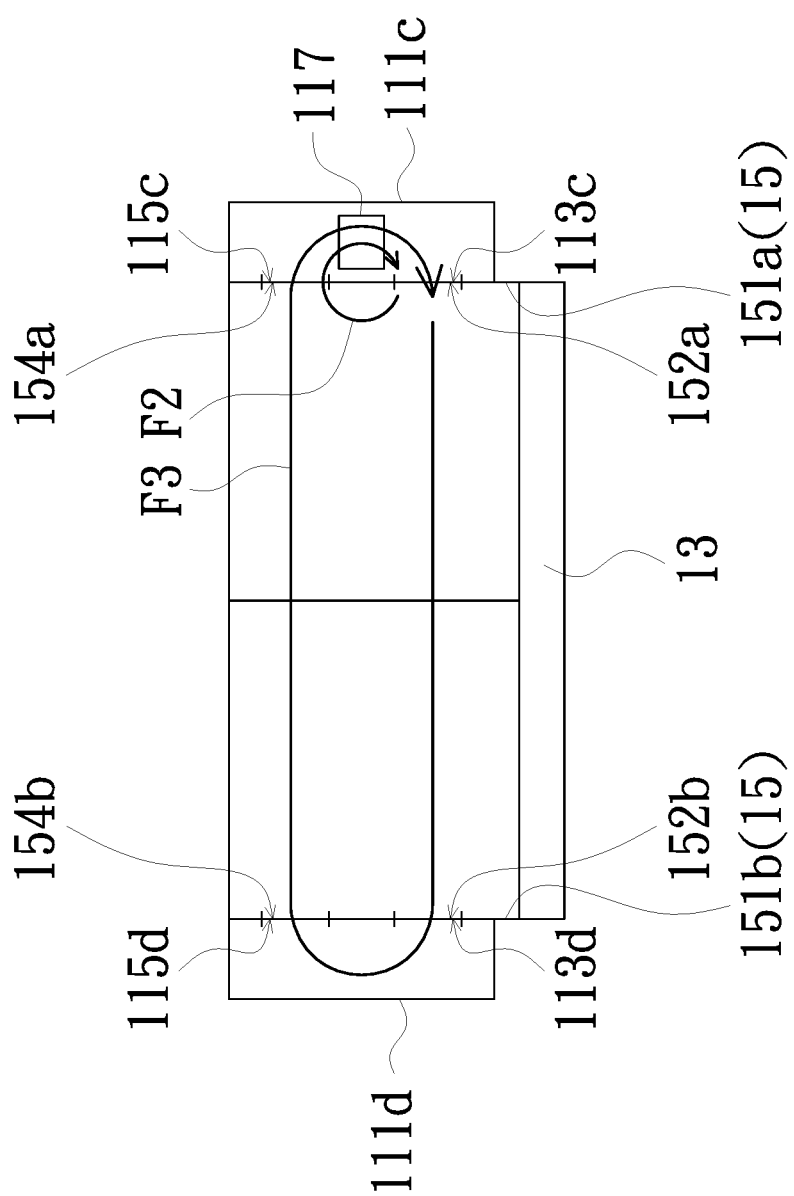
FIG. 7 shows a schematic diagram of an airflow path of a temperature control equipment according to still another embodiment of the invention applied to a docking station.

Referring to FIG. 7, FIG. 7 is a schematic diagram of the airflow path of the temperature control equipment 100a shown in FIG. 6. When the first sub-cover 151a and the second sub-cover 151b are at the closed position, the first airflow opening 113c of the first temperature control device 111c, the first vent 152a of the cover 15, the third vent 154a of the cover 15, and the second airflow opening 115c of the first temperature control device 111c sequentially form a second airflow path F2. The heater 117a is located on the second airflow path F2, so that the air heated by the heater 117a can flow into the interior of the docking station 10.

In addition, when the first sub-cover 151a and the second sub-cover 151b are at the closed position, the first airflow opening 113c of the first temperature control device 111c, the first vent 152a of the cover 15, the second vent 152b of the cover 15, the third airflow opening 113d of the second temperature control device 111d, the fourth airflow opening 115d of the second temperature control device 111d, a fourth vent 154b of the cover 15, the third vent 154a of the cover 15, and the second airflow opening 115c of the first temperature control device 111c sequentially form a third airflow path F3. The heater 117a is located on the third airflow path F3, so that the air heated by the heater 117a can flow into the interior of the docking station 10.

It is worth to notice that in the embodiment, the second airflow path F2 or the third airflow path F3 may exist separately or simultaneously, to which the invention is not limited. The invention also does not limit the direction of air convection on the second airflow path F2 and/or the third airflow path F3.

Specifically, the third vent 154a is disposed on the first sub-cover 151a, the third vent 154a and the first vent 152a are located on the same side of the first sub-cover 151a, the fourth vent 154b is disposed on the second sub-cover 151b, and the fourth vent 154b and the second vent 152b are located on the same side of the second sub-cover 151b. The first temperature control device 111c is disposed outside the first sub-cover 151a, that is, the first temperature control device 111c is disposed on the side of the first sub-cover 151a having the third vent 154a and the first vent 152a. The second temperature control device 111d is disposed outside the second sub-cover 151b, that is, the second temperature control device 111d is disposed on the side of the second sub-cover 151b having the fourth vent 154b and the second vent 152b. A fan may also be disposed on the third vent 154a and/or the fourth vent 154b to convect air.

In summary, the temperature control equipment of the embodiment of the invention is provided with a first temperature control device, a second temperature control device, and a heater. When the cover is at the closed position, the heater can heat the air inside the docking station, which can prevent, for example, the cover of the docking station cannot be opened, the battery of the UAV is abnormally charged, or the equipment of UAV and/or docking station is damaged due to low temperature.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as first vent, second vent, third vent, fourth vent, first temperature control device, second temperature control device, first airflow opening, second airflow opening, third airflow opening, fourth airflow opening, first sub-cover, second sub-cover, first airflow path, second airflow path, third airflow path, first preset value, second preset value are only used for distinguishing various elements and do not limit the number of the elements.

What is claimed is:

1. An Unmanned Aerial Vehicle (UAV) system comprising:
   a docking station comprising a base and a cover, wherein the cover comprises a first vent and a second vent, the cover is connected to the base and moves relative to the base; and
   a temperature control equipment comprising:
   a first cover body, a second cover body and a heater, wherein the first cover body and the second cover body are disposed outside the cover, and
   wherein the first cover body comprises a first airflow opening and a second airflow opening, and the first airflow opening is connected to the first vent, and
   wherein the second cover body comprises a third airflow opening and a fourth airflow opening, and the third airflow opening is connected to the second vent, and
   wherein the heater is disposed inside the first cover body.

2. The UAV system according to claim 1, wherein the cover comprises:
   a first sub-cover and a second sub-cover, the first vent is disposed on the first sub-cover, the second vent is disposed on the second sub-cover, the first cover body is disposed outside the first sub-cover, and the second cover body is disposed outside the second sub-cover.

3. The UAV system according to claim 1, further comprising a fan disposed on the second airflow opening of the first cover body.

4. The UAV system according to claim 1, further comprising a fan disposed inside the first cover body.

5. The UAV system according to claim 4, wherein the fan is adjacent to the heater.

6. The UAV system according to claim 1, wherein the first cover body and the second cover body are detachably disposed outside the cover.

7. The UAV system according to claim 1, wherein the base of the docking station comprises:
   an upper surface, and the top of the first cover body and/or the second cover body comprises at least one surface that is not parallel to the upper surface of the base.

8. The UAV system according to claim 1, further comprising a temperature sensor disposed inside one of the first cover body and the second cover body.

9. The UAV system according to claim 8, wherein the temperature sensor is adjacent to the heater, and the temperature sensor is able to sense the temperature of the heater.

10. The UAV system according to claim 8, wherein:
   the heater or the temperature sensor are coupled to a controller and/or
   a power supply of the docking station by wire or wirelessly when the cover is at the closed position.

11. The UAV system according to claim 8, further comprising:
   a controller or a power supply, the heater or the temperature sensor are coupled to the controller or the power supply by wire or wirelessly when the cover is at a closed position.

12. The UAV system according to claim 1, wherein the first airflow opening of the first cover body and the third airflow opening of the second cover body are closer to the base of the docking station than the second airflow opening of the first cover body and the fourth airflow opening of the second cover body.

13. The UAV system according to claim 1, further comprising a partition between the first cover body and the second cover body.

\* \* \* \* \*